(12) United States Patent
Goto et al.

(10) Patent No.: US 7,295,908 B2
(45) Date of Patent: Nov. 13, 2007

(54) VEHICLE STEERING APPARATUS

(75) Inventors: Takeshi Goto, Toyota (JP); Ryuichi Kurosawa, Okazaki (JP); Kenji Tozu, Yokkaichi (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 342 days.

(21) Appl. No.: 11/157,801

(22) Filed: Jun. 22, 2005

(65) Prior Publication Data

US 2006/0009894 A1 Jan. 12, 2006

(30) Foreign Application Priority Data

Jun. 23, 2004 (JP) .............................. 2004-184448

(51) Int. Cl.
*B62D 5/04* (2006.01)

(52) U.S. Cl. ..................... 701/43; 180/443; 180/446

(58) Field of Classification Search ................. 701/41, 701/42; 180/410, 413, 421, 422, 443, 446
See application file for complete search history.

(56) References Cited

U.S. PATENT DOCUMENTS 6,173,221 B1 1/2001 Boehringen et al.
6,655,490 B2 * 12/2003 Andonian et al. .......... 180/402
7,203,582 B2 * 4/2007 Yokota ........................ 701/41
2006/0047391 A1 * 3/2006 Katou .......................... 701/41
2006/0086561 A1 * 4/2006 Hidaka ..................... 180/446
2006/0149445 A1 * 7/2006 Suzumura et al. ............. 701/41
2006/0200289 A1 * 9/2006 Chino et al. .................. 701/41

FOREIGN PATENT DOCUMENTS

JP A 11-124047 5/1999
JP A 2000-85604 3/2000

* cited by examiner

*Primary Examiner*—Gary Chin
(74) *Attorney, Agent, or Firm*—Oliff & Berridge, PLC (57) ABSTRACT

In a vehicle steering apparatus, front wheels are controlled to be turned by a computer program processing. A displacement/torque conversion section 51 converts a steering angle θ into a steering torque Td that is in relation of exponential function. A torque/lateral-acceleration conversion section 52 converts into an anticipated lateral acceleration Gd based upon the steering torque Td. A turning angle conversion section 55 calculates target turning angles δd. A turning angle correcting section 61 obtains a slip angle β of a slip generated on a vehicle. Then, the turning angle correcting section 61 corrects the target turning angle δd based upon the obtained slip angle β, thereby calculating a corrected target turning angle δda. A drive control section 63 controls the steered wheels to be turned into the corrected target turning angle δda. According to this, a driver can correctly perceive the generated anticipated lateral acceleration Gd, whereby he/she can easily drive the vehicle.

8 Claims, 5 Drawing Sheets

VEHICLE STEERING APPARATUS

BACKGROUND OF THE INVENTION

1. Field of the Invention

The present invention relates to a vehicle steering apparatus of a steer-by-wire system provided with a steering handle operated by a driver for steering a vehicle, a turning actuator for turning steered wheels and a turning control device that drive-controls the turning actuator according to the operation on the steering handle for turning the steered wheels.

2. Description of the Related Art

The development of the steering apparatus of a steer-by-wire system of this type has recently been carried out positively. For example, the following Patent Reference 1 discloses a steering apparatus that detects a steering angle and a vehicle speed, calculates a transmission ratio that decreases with the increase in the steering angle and increases with the increase in the vehicle speed, calculates the turning angle (displacement amount of a rack shaft) of a front wheel by dividing the steering angle by this transmission ratio and turns the front wheels into the calculated turning angle. In this steering apparatus, the calculated turning angle is corrected according to the steering speed that is obtained by time-differentiating the detected handle steering angle, thereby enhancing the steering response and tracking performance of the front wheel. Further, a target yaw rate is calculated by using the detected vehicle speed and the detected handle steering angle, and the calculated turning angle is corrected according to the difference between the calculated target yaw rate and the detected actual yaw rate, thereby realizing the turning control considering the vehicle behavior.

The following Patent Reference 2 discloses a steering apparatus that detects a steering torque and a handle steering angle, calculates two turning angles that increase with the increase in the steering torque and the handle steering angle, and turns the front wheels into the turning angle that is obtained by adding up these calculated turning angles. In this steering apparatus, the vehicle speed is also detected, wherein both turning angles are corrected by this detected vehicle speed, thereby changing the turning characteristic according to the vehicle speed.

[Patent Reference 1]

Japanese Unexamined Patent Application No. 2000-85604

[Patent Reference 2]

Japanese Unexamined Patent Application No. HEI11-124047

The conventional both apparatuses detect the steering angle and steering torque that are operation input values by a driver to a steering handle for steering the vehicle, directly calculates the turning angle of the front wheel by using these detected steering angle and steering torque, and turns the front wheels into the calculated turning angle. However, although the mechanical connection between the steering handle and the steered wheels is unlocked, these turning controls of the front wheels are totally the same in the basic technical concept wherein the turning angle of the front wheel is decided so as to correspond to the steering position and steering force of the steering handle from the viewpoint of a steering method of the front wheels with respect to the operation of the steering handle. The turning angle of the front wheel is not decided so as to correspond to a man's sensory characteristic by these turning methods, so that the driver has a sense of incongruity and has a hard time for driving the vehicle.

Specifically, in the conventional apparatuses, the turning angle that cannot be perceived by the driver is directly decided so as to correspond to the operation of the steering handle, and the vehicle is turned by the turning of the front wheels according to the turning angle. The driver has sensed with a sense of touch or sight the lateral acceleration, yaw rate and turning curvature of the vehicle caused by the turn of the vehicle and has fed them back to the operation of the steering handle for turning the vehicle in a desired manner. In other words, the turning angle of the front wheel with respect to the operation of the steering handle by the driver is a physical quantity that a man cannot perceive. Therefore, the turning angle directly decided with respect to the steering operation by the driver is not decided so as to be adapted to the driver's perception characteristic, with the result that the driver has a sense of incongruity. This makes it difficult for the driver to drive the vehicle.

In the conventional apparatuses, the decided turning angle is corrected according to the difference between the target yaw rate, which is calculated by using the detected vehicle speed and the detected handle steering angle, and the detected actual yaw rate. This is only a correction of the turning angle considering the vehicle behavior, so that the turning angle is not decided according to the yaw rate that the driver is to perceive by every-changing vehicle steering characteristic (e.g., the change in the steering characteristic due to a slip caused by the change in the friction force between a road surface and wheels) and the operation of the steering handle. Accordingly, in this case too, the turning angle decided with respect to the steering operation of the driver is not decided so as to be adapted to the driver's perception characteristic, and hence, this makes it difficult for the driver to drive the vehicle.

SUMMARY OF THE INVENTION

In order to cope with the aforesaid problem, the present inventors have grappled with the research of a vehicle steering apparatus that can steer a vehicle as adapted to a man's perception characteristic with respect to an operation of a steering handle by a driver. As for the man's perception characteristic described above, the Weber-Fechner's law states that human sensory amount is proportional to the logarithm of a physical quantity of given stimulation. In other words, if the physical quantity of the stimulation given to a human with respect to the operation amount by the human is changed in the manner of exponential function in case where the operation amount is a displacement, or if the aforesaid physical quantity is changed in the manner of exponentiation function in case where the operation amount is a torque, the relationship between the operation amount and the physical quantity can be adapted to the man's perception characteristic. The present inventors have found the following, as a result of applying the Weber-Fechner's law to a vehicle steering operation.

Upon driving a vehicle, the vehicle turns by the operation on a steering handle. The turn of the vehicle changes vehicle motion state quantity such as the lateral acceleration, yaw rate, turning curvature or the like. The driver senses this vehicle motion state quantity with a sense of touch or sight. Therefore, if the vehicle motion state quantity that a driver can perceive is changed in the manner of exponential function or in the manner of exponentiation function with respect to the operation on the steering handle by the driver, he/she can drive the vehicle by operating the steering handle as adapted to the perception characteristic.

The present invention is based upon the above-mentioned finding, and aims to provide a vehicle steering apparatus wherein a vehicle is steered with respect to an operation by a driver to a steering handle, as a motion state quantity adapted to a man's perception characteristic is correctly generated, thereby facilitating driving a vehicle.

In order to attain the foregoing object, the present invention is characterized in that, in a vehicle steering apparatus of a steer-by-wire system provided with a steering handle operated by a driver for steering a vehicle, a turning actuator for turning steered wheels and a turning control device that drive-controls the turning actuator according to the operation on the steering handle for turning the steered wheels, wherein the turning control device comprises: operation input value detecting means that detects an operation input value by a driver to the steering handle; motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and is in the predetermined relation of exponential function or in the predetermined relation of exponentiation function with the operation input value to the steering handle; turning angle calculating means that calculates a turning angle of the steered wheels necessary for the vehicle to turn with the anticipated motion state quantity calculated by the motion state quantity calculating means by using the calculated motion state quantity; motion state quantity detecting means that detects an actual motion state quantity representing an actual motion state of the vehicle; steering characteristic quantity calculating means that calculates a steering characteristic quantity relating to the vehicle actual turning state based upon the detected actual motion state quantity; turning angle correcting means that corrects the calculated turning angle by using the calculated steering characteristic amount in order to generate the calculated anticipated motion state quantity; and turning control means that controls the turning actuator according to the corrected turning angle for turning the steered wheels into the corrected turning angle.

In this case, the anticipated motion state quantity is at least either one of a lateral acceleration and a yaw rate generated on the vehicle. Further, the turning angle correcting means may correct the calculated turning angle by using the calculated steering characteristic quantity in order to decrease the phase difference between the period when the anticipated motion state quantity is generated and the period when the actual motion state quantity corresponding to the anticipated motion state quantity is generated. Moreover, the turning angle correcting means may correct the calculated turning angle by using the calculated steering characteristic quantity in order to decrease the response delay from when the turning control means starts to control the turning actuator to when the steered wheels are turned into the corrected turning angle. The steering characteristic quantity calculated by the steering characteristic quantity calculating means may be a slip angle representing a slip that is generated by the turn of the vehicle.

Further, the operation input value detecting means can be composed of, for example, a displacement amount sensor that detects a displacement amount of the steering handle. In this case, the motion state quantity calculating means may be composed of operation force conversion means that converts the detected displacement amount into the operation force exerted on the steering handle and motion state quantity conversion means that converts the converted operation force into the anticipated motion state quantity. The operation force conversion means may convert the displacement amount into the operation force that is in the relation of exponential function with the displacement amount, while the motion state quantity conversion means may convert the operation force into an anticipated motion state quantity that is in the relation of exponential function with the operation force.

The operation input value detecting means can be composed of, for example, an operation force sensor that detects the operation force exerted on the steering handle. In this case, the motion state quantity calculating means may be composed of motion state quantity conversion means that converts the detected operation force into the anticipated motion state quantity. The motion state quantity conversion means may convert the operation force into an anticipated motion state quantity that is in the relation of exponentiation function with the operation force. Moreover, a reaction force apparatus for giving reaction force to the operation of the steering handle may be mounted in these vehicle steering apparatuses.

In the present invention having the aforesaid configuration, the operation input value to the steering handle by the driver is firstly converted into the vehicle anticipated motion state quantity (lateral acceleration, yaw rate, etc.) that relates to a turn of the vehicle, can be sensed by a driver and is in the predetermined relation of exponential function or in the predetermined relation of exponentiation function with the operation input value to the steering handle. Then, the turning angle of the steered wheels necessary for the vehicle to turn with the anticipated motion state quantity is calculated based upon the converted anticipated motion state quantity. The calculated turning angle is corrected so as to correctly generate an anticipated motion state quantity, and the steered wheels are turned into the corrected turning angle. Therefore, when the vehicle turns by the turning of the steered wheels, the anticipated motion state quantity is given to the driver as the "physical quantity of the given stimulation" in accordance with the Weber-Fechner's law. Since the anticipated motion state quantity is changed in the manner of exponential function or in the manner of exponentiation function with respect to the operation input value to the steering handle, the driver can turn the steering handle as perceiving the motion state quantity adapted to a man's perception characteristic. The driver can tactilely sense the lateral acceleration and yaw rate by the contact to each section in the vehicle. As a result, the driver can turn the steering handle as adapted to the man's perception characteristic, whereby the driver can easily drive the vehicle without having a sense of incongruity.

Since the turning angle is corrected based upon a steering characteristic quantity (e.g., a slip angle generated on the vehicle) relating to the vehicle turning state of when the vehicle actually turns, the anticipated lateral acceleration can be generated at a more correct timing. Specifically, the driver has a sense of incongruity due to the occurrence of a phase difference (phase lag or delay) between the period when the actual motion state quantity is actually generated on the vehicle and the period when the generation of the anticipated motion state quantity is anticipated. This phase difference is caused, for example, by the difference between the turning state expected beforehand and the actual turning state due to the change in the slip angle generated on the vehicle. This phase difference is considered to be a time difference until the actual vehicle turning state agrees with the turning state expected beforehand with the lapse of time. Accordingly, the actual vehicle turning state can be agreed with the turning state expected beforehand at an earlier stage by correcting the turning angle considering the slip angle or the like currently generated on the vehicle. Therefore, the vehicle can turn as reducing the time difference, i.e., phase difference, by the time when the actual motion state quantity corresponding to the anticipated motion state quantity is generated. As a result, the driver can correctly perceive the anticipated motion state quantity without having a sense of incongruity, whereby the driver can more easily drive the vehicle.

In case where, for example, the driver turns the steering handle so as to bring the vehicle into a turning state from straight running state, there may be a case where the driver has a sense of incongruity before he/she starts to perceive the anticipated motion state quantity. Specifically, the driver has to more greatly turn the steering handle, thus having a sense of incongruity, in case where a response delay (transient response delay) is great from when the steered wheels start to be turned with respect to the operation of the steering handle to when the driver starts to perceive the anticipated motion state quantity (actual motion state quantity). The case where the driver feels that the response delay (transient response delay) is great is that he/she perceives the vehicle running direction is not quickly changed to the desired direction due to the occurrence of a slip on the vehicle. Accordingly, the vehicle can be turned without the response delay by correcting the turning angle considering the slip angle or the like currently generated on the vehicle. As a result, the driver is difficult to sense the response delay (transient response delay) with respect to the operation on the steering handle, and further, the driver can perceive the correctly generated anticipated motion state quantity, whereby he/she can more easily drive the vehicle.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

First Embodiment

Figure 1:
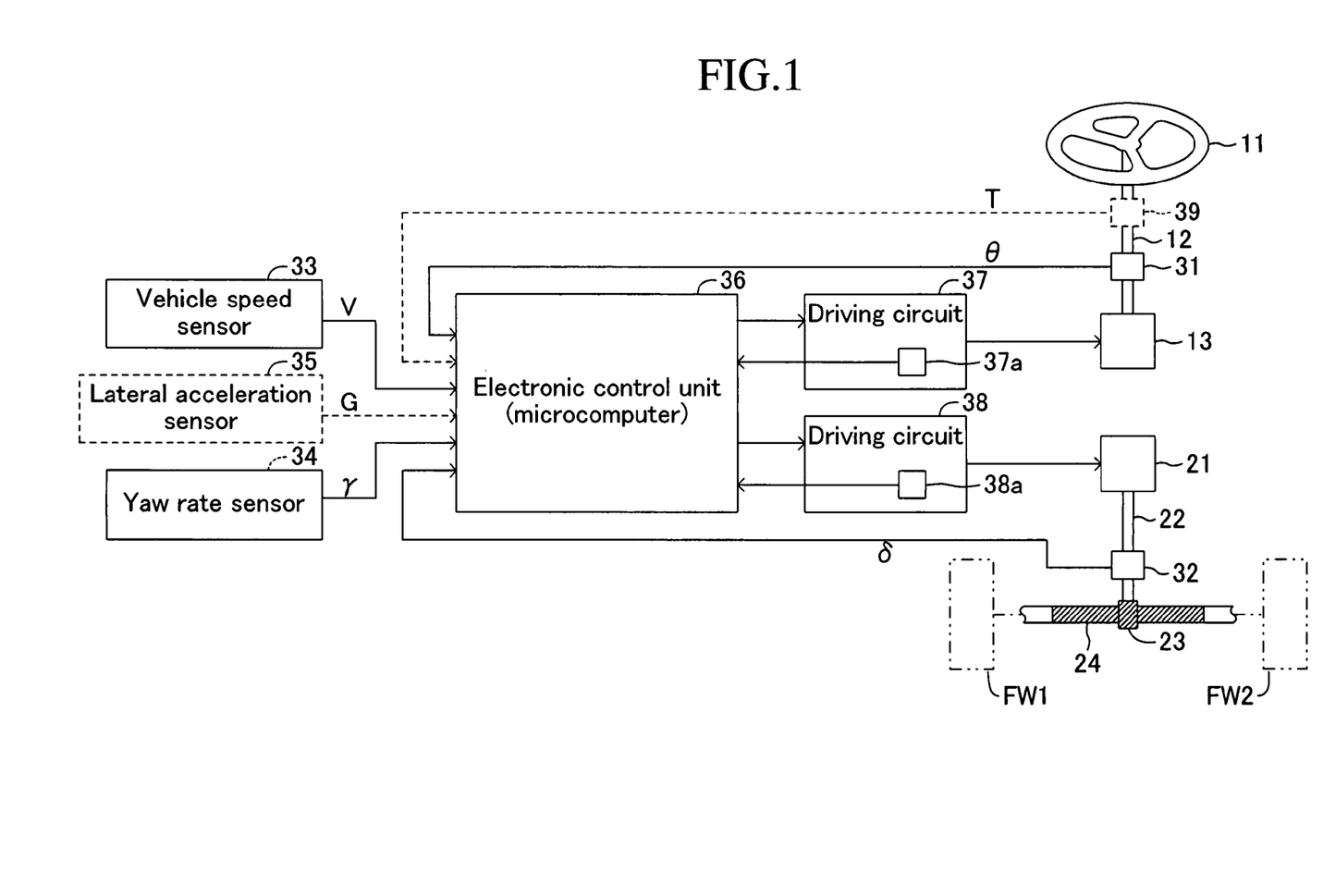
FIG. 1 is a schematic view of a vehicle steering apparatus common to first and second embodiments of the present invention.

A vehicle steering apparatus according to a first embodiment of the present invention will be explained hereinafter with reference to the drawings. FIG. 1 is a block diagram schematically showing the vehicle steering apparatus according to the first embodiment.

This steering apparatus is provided with a steering handle 11 as an operating section that is turned by a driver for steering left and right front wheels FW1 and FW2, those of which are steered wheels. The steering handle 11 is fixed to the upper end of a steering input shaft 12. The lower end of the steering input shaft 12 is connected to a reaction force actuator 13 composed of an electric motor and deceleration mechanism. The reaction force actuator 13 exerts reaction force on the turning operation of the steering handle 11 by a driver.

This steering apparatus is further provided with a turning actuator 21 composed of an electric motor and a deceleration mechanism. The turning force by the turning actuator 21 is transmitted to the left and right front wheels FW1 and FW2 via a turning output shaft 22, pinion gear 23 and rack bar 24. According to this configuration, the rotational force from the turning actuator 21 is transmitted to the pinion gear 23 via the turning output shaft 22, whereby the rotation of the pinion gear 23 displaces the rack bar 24 in the axial direction. The displacement of the rack bar 24 in the axial direction allows the left and right front wheels FW1 and FW2 to be turned to the left or to the right.

Subsequently explained is an electronic controller for controlling the rotations of the reaction force actuator 13 and the turning actuator 21. The electronic controller has a steering angle sensor 31, turning angle sensor 32, vehicle speed sensor 33 and yaw rate sensor 34.

The steering angle sensor 31 is attached to the steering input shaft 12. It detects the rotation angle of the steering handle 11 from the neutral position and outputs the detected angle as a steering angle θ. The turning angle sensor 32 is attached to the turning output shaft 22. It detects the rotation angle of the turning output shaft 22 from the neutral position and outputs the detected angle as an actual turning angle δ (corresponding to the turning angles of the left and right front wheels FW2 and FW2). It should be noted that the steering angle θ and the actual turning angle δ represent such that, with their neutral position defined as "0", the rotation angle in the leftward direction is represented by a positive value and the rotation angle in the rightward direction is represented by a negative value. The vehicle speed sensor 33 detects a vehicle speed V and outputs the detected speed. The yaw rate sensor 34 detects the actual yaw rate γ of the vehicle and outputs the resultant. The actual yaw rate γ is also represented such that the turn (turning direction) in the leftward direction is represented by a positive value and the turn (turning direction) in the rightward direction is represented by a negative value.

These sensors 31 to 34 are connected to an electronic control unit 36. The electronic control unit 36 has a microcomputer, composed of CPU, ROM, RAM or the like, as a main component. The electronic control unit 36 controls respectively the operations of the reaction force actuator 13 and the turning actuator 21 by the execution of a program. Driving circuits 37 and 38 for driving the reaction force actuator 13 and the turning actuator 21 are connected to the output side of the electronic control unit 36. Disposed in the driving circuits 37 and 38 are current detectors 37a and 38a for detecting driving current flowing through the electric motors in the reaction force actuator 13 and the turning actuator 21. The driving current detected by the current detectors 37a and 38a is fed back to the electronic control unit 36 for controlling the drive of both electric motors.

Figure 2:
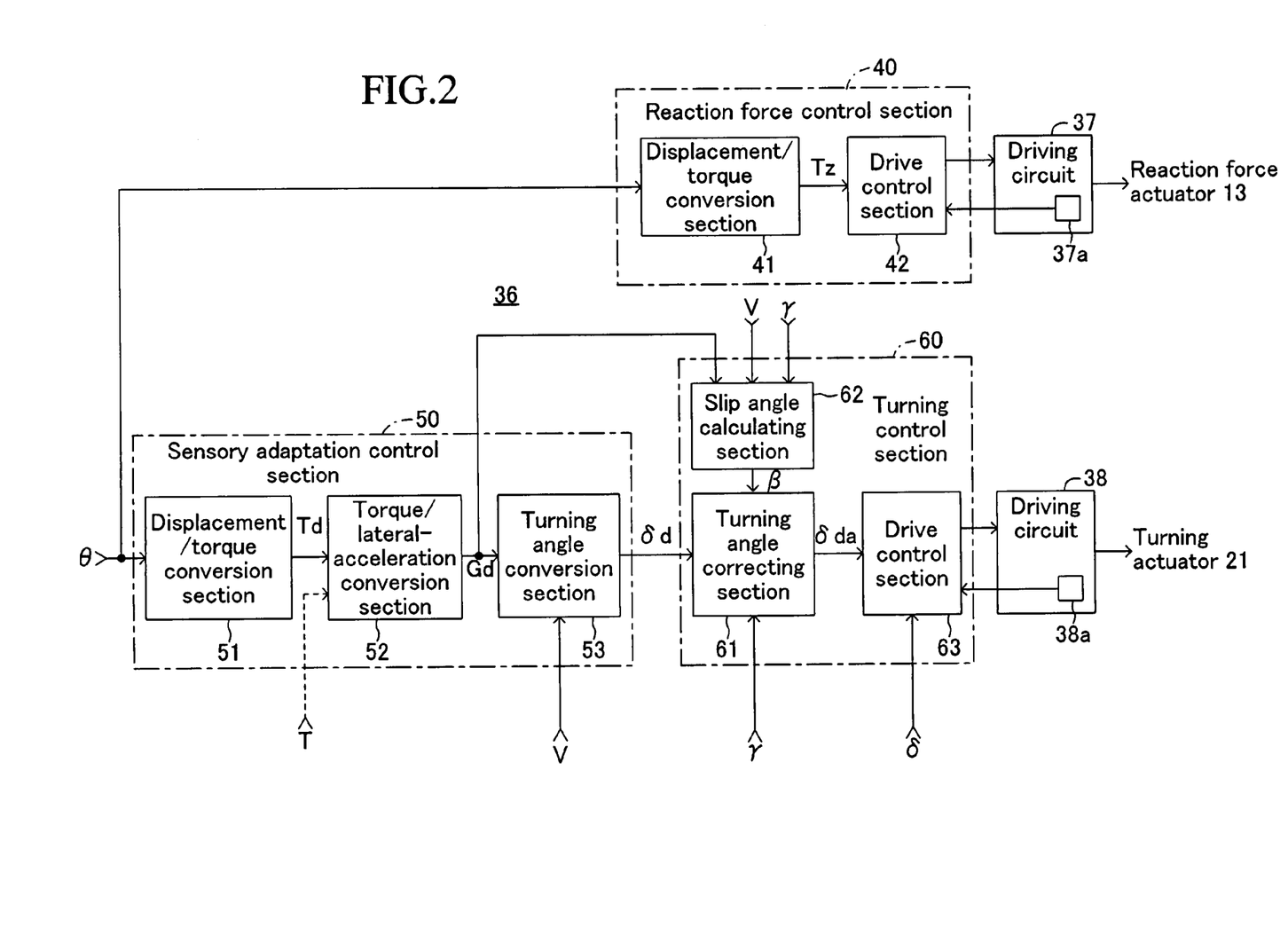
FIG. 2 is a functional block diagram functionally showing a computer program processing executed by an electronic control unit of FIG. 1 according to the first embodiment.

Subsequently, the operation of the first embodiment having the above-mentioned configuration will be explained with reference to a functional block diagram shown in FIG. 2 showing a function realized by a computer program process in the electronic control unit 36. The electronic control unit 36 comprises a reaction force control section 40 for controlling the exertion of reaction force to the steering handle 11, a sensory adaptation control section 50 for deciding a target turning angle δd of the left and right front wheels FW1 and FW2 corresponding to the sensation of a driver based upon the turning operation of the steering handle 11 and a turning control section 60 for controlling to turn the left and right front wheels FW1 and FW2 based upon the target turning angle δd.

When the driver turns steering handle 11, the steering angle sensor 31 detects the steering angle θ that is a rotation angle of the steering handle 11. The detected steering angle θ is outputted to the reaction force control section 40 and the sensory adaptation control section 50 respectively. In the reaction force control section 40, when the driver operates to turn the steering handle 11, a displacement/torque conversion section 41 calculates reaction force torque $T_Z$, that is the linear function of the steering angle θ, in accordance with the following equation 1, if the absolute value of the steering angle θ of the steering handle 11 is less than a positive predetermined value $\theta_Z$. If the absolute value of the steering angle θ is not less than the positive predetermined value $\theta_Z$, the displacement/torque conversion section 41 calculates reaction force torque $T_Z$, that is the exponential function of the steering angle θ, in accordance with the following equation 2. The linear function of the equation 1 and the exponential function of the equation 2 are continuously connected at the steering angle $\theta_Z$. For example, the tangent intersecting the origin "0" of the steering angle $\theta_Z$ in the exponential function of the equation 2 may be adopted as the linear function of the equation 1. The equation 1 is not limited to the linear function. Any functions can be adopted, so long as they have a relationship in which the reaction force $T_Z$ becomes "0" when the steering angle θ is "0" and they are continuously connected to the exponential function of the equation 2.

$$T_Z = a \cdot \theta \, (|\theta| < \theta_Z) \qquad \text{Equation 1}$$

$$T_Z = T_o \cdot \exp(K1 \cdot \theta)(\theta_Z \leq |\theta|) \qquad \text{Equation 2}$$

Figure 3:
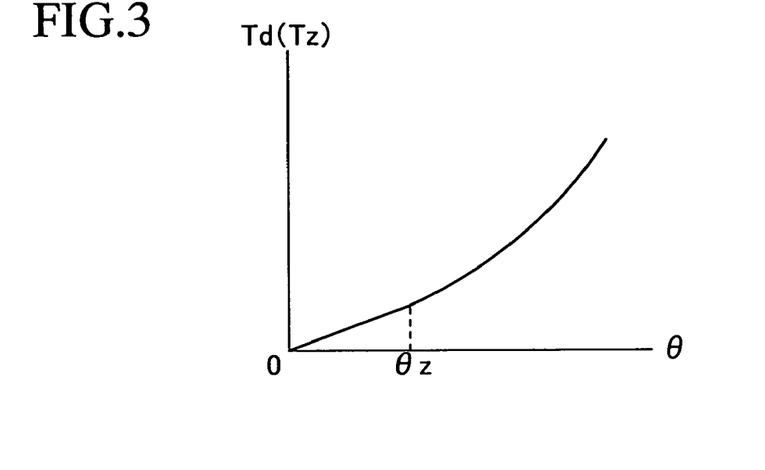
FIG. 3 is a graph showing a relationship between a steering angle and a steering torque.

In the equation 1, a is a constant representing the slope of the linear function. Further, To and K1 are constants, wherein To is the minimum steering torque that a driver can perceive. The constant K1 will be explained in more detail in the later-described explanation about the sensory adaptation control section 50. The steering angle θ in the equation 1 and equation 2 represents an absolute value of the detected steering angle θ. Therefore, if the detected steering angle θ is positive, the constant a and the constant To are made negative, while if the detected steering angle θ is negative, the constant a and the constant To are made positive having the absolute value same as the negative constant a and the negative constant To. The reaction force torque $T_Z$ may be calculated by using a conversion table having a characteristic shown in FIG. 3 and having stored therein the reaction force torque $T_Z$ with respect to the steering angle θ, instead of the calculations of the equations 1 and 2.

The calculated reaction force torque $T_Z$ is supplied to a drive control section 42. The drive control section 42 inputs driving current flowing through the electric motor in the reaction force actuator 13 from the driving circuit 37 and feedback-controls the driving circuit 37 such that the driving current corresponding to the reaction force torque $T_Z$ flows through the electric motor. The drive control of the electric motor in the reaction force actuator 13 causes the electric motor to exert the reaction force torque $T_Z$ on the steering handle 11 via the steering input shaft 12. Accordingly, the driver starts the turning operation of the steering handle 11, and turns the steering handle 11, feeling the reaction force torque $T_Z$ that is changed in a manner of linear function when the steering angle is less than the steering angle $\theta_Z$, while feeling the reaction force $T_Z$ that is changed in a manner of exponential function when the steering angle is not less than the steering angle $\theta_Z$. In other words, the driver operates to turn the steering handle 11 as adding the steering torque that is equal to the reaction force torque $T_Z$ changed as described above, to the steering handle 11.

More specifically, when the driver turns the steering handle 11 from the neutral position, the reaction force $T_Z$ that is changed in the manner of linear function according to the equation 1, i.e., with respect to the detected steering angle θ is calculated, if the steering angle is less than the predetermined steering angle $\theta_Z$. When the detected steering angle θ becomes not less than the predetermined steering angle $\theta_Z$, the reaction force torque $T_Z$ that is changed in the manner of exponential function according to the equation 2, i.e., with respect to the detected steering angle θ is calculated. Since the equation 1, i.e., the linear function, and the equation 2, i.e., the exponential function are continuously connected when the reaction force torque $T_Z$ is changed from the calculation in accordance with the equation 1 to the calculation in accordance with the equation 2 at the predetermined steering angle $\theta_Z$, the driver does not feel the incongruity of the reaction force torque $T_Z$ caused with the change. When the detected steering angle θ is not less than the predetermined steering angle $\theta_Z$, the relationship between the steering angle θ and the reaction force torque $T_Z$ is in accordance with the Weber-Fechner's law, whereby the driver can turn the steering handle 11, receiving a sensation adapted to a man's perception characteristic from the steering handle 11.

On the other hand, when the driver operates to turn the steering handle 11 toward the neutral position, the driver operates the steering handle 11 as perceiving the reaction force torque $T_Z$ in accordance with the Weber-Fechner's law, i.e., the reaction force torque $T_Z$ changed in the manner of exponential function with respect to the steering angle θ, as stated above. When the steering handle 11 takes a position in the vicinity of the neutral position, i.e., when the detected steering angle θ becomes less than the predetermined steering angle $\theta_Z$, the reaction force torque $T_Z$ perceived by a driver is calculated as changed from the equation 2 to the equation 1. By calculating the reaction force $T_Z$ as changed from the equation 2 to the equation 1 as described above, the reaction force $T_Z$ is converged to "0" in view of the linear function with respect to the steering angle θ.

In case where the calculation of the reaction force torque $T_Z$ up to the neutral position of the steering handle 11 is in accordance with the equation 2, the reaction force torque $T_Z$ becomes a predetermined value To, even though the steering angle θ in the equation 2 is "0". In case where the driver slightly turns the steering handle 11 from the neutral position, turning vibration of the steering handle 11 toward the neutral position is generated due to the reaction force torque To. This causes a vibration on the steering handle 11 under the condition where the reaction force torque $T_Z$ is applied at the neutral position of the steering handle 11, thus unpreferable. However, in case where the detected steering angle θ is less than the predetermined steering angle $\theta_Z$, the reaction force torque $T_Z$ is calculated in accordance with the equation 1 that continuously converges the reaction force torque $T_Z$ to "0" with respect to the steering angle θ, i.e., with respect to the decrease in the absolute value of the steering angle θ, whereby the reaction force torque $T_Z$ can be made "0" at the neutral position of the steering handle 11. Accordingly, the generation of the vibration at the neutral position of the steering handle 11 can be prevented.

A steering torque Td is calculated at a displacement/torque conversion section 51 from the steering angle θ inputted to the sensory adaptation control section 50 in accordance with the following equations 3 and 4 that are similar to the equations 1 and 2. In the calculation of the steering torque Td, the equation 3 is not limited to the linear function. Any functions can be adopted, so long as they have a relationship in which the steering torque Td becomes "0" when the steering angle θ is "0" and they are continuously connected to the exponential function of the equation 4.

$$Td = a \cdot \theta \, (|\theta| < \theta_Z) \quad \text{Equation 3}$$

$$Td = To \cdot \exp(K1 \cdot \theta) \, (\theta_Z \leq |\theta|) \quad \text{Equation 4}$$

In the equation 3, a is a constant representing the slope of the linear function. Further, To and K1 in the equation 4 are constants similar to those in the equation 2. The steering angle θ in the equation 3 and equation 4 represents an absolute value of the detected steering angle θ. Therefore, if the detected steering angle θ is positive, the constant a and the constant To are made positive, while if the detected steering angle θ is negative, the constant a and the constant To are made negative having the absolute value same as the positive constant a and the positive constant To. The steering torque Td may also be calculated by using a conversion table having a characteristic shown in FIG. 3 and having stored therein the steering torque Td with respect to the steering angle θ, instead of the calculations of the equations 3 and 4.

The calculated steering torque Td is supplied to the torque/lateral-acceleration conversion section 52. The torque/lateral-acceleration conversion section 52 calculates the anticipated lateral acceleration Gd that is anticipated by the driver from the turning operation of the steering handle 11, according to the following equation 5.

$$Gd = C \cdot Td^{K2} \, (To \leq |Td|) \quad \text{Equation 5}$$

Figure 4:
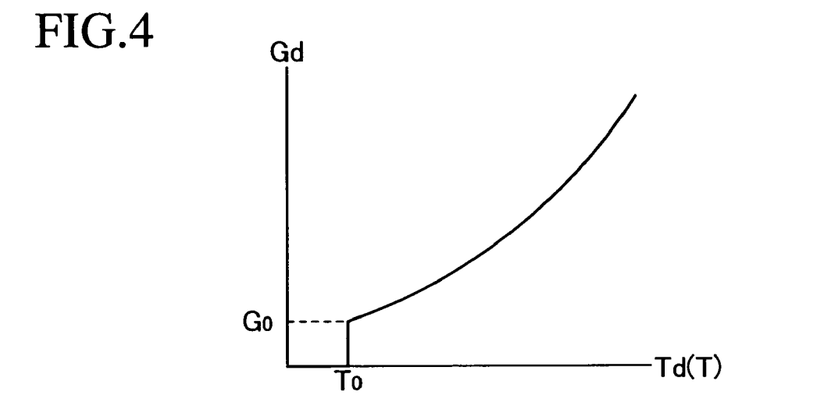
FIG. 4 is a graph showing a relationship between a steering torque and an anticipated lateral acceleration.

C and K2 in the equation 5 are constants. The steering torque Td in the equation 5 represents an absolute value of the steering torque Td calculated by using the equations 3 and 4. Therefore, if the calculated steering torque Td is positive, the constant C is made positive, while if the calculated steering torque Td is negative, the constant C is made negative having the absolute value same as the positive constant C. Further, in case where the steering torque Td is less than the predetermined value To, the anticipated lateral acceleration Gd is kept to be "0". According to this, in case where the steering handle 11 is held to be at the neutral position (where the steering angle θ is almost "0"), the anticipated lateral acceleration Gd is kept to be "0", thereby being capable of being adapted to a driver's perception characteristic. The anticipated lateral acceleration Gd may also be calculated by using a conversion table having a characteristic shown in FIG. 4 and having stored therein the anticipated lateral acceleration Gd with respect to the steering torque Td, instead of the calculation of the equation 5.

The equation 5 will be explained here. When the steering torque Td is eliminated by using the equation 4, the following equation 6 is obtained.

$$Gd = C \cdot (To \cdot \exp(K1 \cdot \theta))^{K2} = C \cdot To^{K2} \cdot \exp(K1 \cdot K2 \cdot \theta) = Go \cdot \exp(K1 \cdot K2 \cdot \theta) \quad \text{Equation 6}$$

In the equation 6, Go is the constant $C \cdot To^{K2}$, and the equation 6 shows that the anticipated lateral acceleration Gd is changed in a manner of exponential function with respect to the steering angle θ of the steering handle 11 by the driver. The anticipated lateral acceleration Gd is a physical quantity that the driver can perceive by the contact of a part of the driver's body to a predetermined section in the vehicle, and is in accordance with the aforesaid Weber-Fechner's law. Accordingly, if the driver can turn the steering handle 11 as perceiving the lateral acceleration equal to the anticipated lateral acceleration Gd, the relationship between the turning operation of the steering handle 11 and the vehicle turning can be associated with the human's perception characteristic.

Since the anticipated lateral acceleration Gd represented by the equation 5 (i.e., equation 6) is changed in the manner of exponential function with respect to the steering angle θ that is the turning amount of the steering handle 11 as described above, the anticipated lateral acceleration Gd is adapted to the human's perception characteristic. Further, the easiest process in the turning operation of the steering handle 11 by the driver is to turn the steering handle 11 at a constant speed ω (θ=ω·t). According to this turning operation, the anticipated lateral acceleration Gd changes in the manner of exponential function with respect to a time t as represented by the following equation 7. Accordingly, it is understood from this that the turning operation of the steering handle 11 by the driver is facilitated if the driver can turn the steering handle 11 as perceiving the lateral acceleration equal to the anticipated lateral acceleration Gd.

$$Gd = Go \cdot \exp(K0 \cdot \omega \cdot t) \quad \text{Equation 7}$$

It should be noted that K0 is a constant having a relationship of $K0 = K1 \cdot K2$.

Subsequently explained is how to determine the parameters K1, K2 and C (predetermined values K1, K2 and C) used in the equations 1 to 7. In the explanation of how to determine the parameters K1, K2 and C, the steering torque Td and the anticipated lateral acceleration Gd in the equations 1 to 7 are handled as the steering torque T and the lateral acceleration G. According to the Weber-Fechner's law, "the ratio of ΔS/S of the minimum change ΔS in the physical quantity that the human can perceive and the physical quantity S at this point is constant regardless of the value of the physical quantity S, and this ratio ΔS/S is called the Weber ratio". The present inventors have confirmed that the Weber-Fechner's law is established in the steering torque and the lateral acceleration, and has carried out the following test to various types of people whose sex, age, driving experience, etc. are varied.

As for the steering torque, a torque sensor is attached to the steering handle of a vehicle. Test torque was externally applied to the steering handle and this test torque was varied in various manners, thereby measuring a man's steering torque adjusting ability that he/she gives operation force to the steering handle against this test torque for making an adjustment so as not to rotate the steering handle. Specifically, under the aforesaid condition, the ratio ΔT/T, supposing that the detected steering torque at a certain point is defined as T and the minimum steering torque changing amount that he/se can sense the change from the detected steering torque T is defined as ΔT, i.e., the Weber ratio was measured for various types of people. As a result of this test, the Weber ratio ΔT/T became generally a constant value for various types of people, regardless of the operating direction of the steering handle, the form of hands gripping the steering handle, magnitude or direction of the test torque or the like.

A test for the lateral acceleration is as follows. A wall member was provided at the side of the driver's seat, and a force sensor for detecting pressing force of a man's shoulder to the wall member was attached. A man's shoulder was brought into contact with the force sensor on the wall member. Test force was externally applied to the wall member in the widthwise direction with respect to the man and the test force was varied in various manners, thereby measuring a man's lateral force adjusting ability that the man pushed the wall member against this test force so as not to move the wall member, i.e., that the man held his/her posture. Specifically, under this condition, the ratio $\Delta F/F$, supposing that the detected force at a certain point that the man keeps his/her posture as standing the external lateral force is defined as F and the minimum force changing amount that he/se can sense the change from the detected force F is defined as $\Delta F$, i.e., the Weber ratio was measured for various types of people. As a result of this test, the Weber ratio $\Delta F/F$ became generally a constant value for various types of people, regardless of the magnitude or direction of the reference force applied to the wall member.

On the other hand, when the equation 4 is differentiated and the equation 4 is considered in the differentiated equation, the following equation 8 is established.

$$\Delta T = To \cdot \exp(K1 \cdot \theta) \cdot K1 \cdot \Delta\theta = T \cdot K1 \cdot \Delta\theta \qquad \text{Equation 8}$$

When this equation 8 is changed and the Weber ratio $\Delta T/T$ relating to the steering torque obtained by the above-mentioned test is defined as Kt, the following equation 9 is established.

$$K1 = \Delta T/(T \cdot \Delta\theta) = Kt/\Delta\theta \qquad \text{Equation 9}$$

Further, supposing that the maximum steering torque is Tmax, the following equation 10 is established from the equation 4.

$$T\max = To \cdot \exp(K1 \cdot \theta\max) \qquad \text{Equation 10}$$

Changing this equation 10 establishes the following equation 11.

$$K1 = \log(T\max/To)/\theta\max \qquad \text{Equation 11}$$

Then, the following equation 12 is derived from the equations 9 and 11.

$$\Delta\theta = Kt/K1 = Kt \cdot \theta\max/\log(T\max/To) \qquad \text{Equation 12}$$

In this equation 12, Kt is the Weber ratio of the steering torque T, $\theta$max is the maximum value of the steering angle, Tmax is the maximum value of the steering torque, and To corresponds to the minimum steering torque that a man can perceive. These values Kt, $\theta$max, Tmax and To are constants determined by the test and system, so that the differential value $\Delta\theta$ can be calculated by using the equation 12. The predetermined value (coefficient) K1 can also be calculated by using this differential value $\Delta\theta$ and the Weber ratio Kt based upon the equation 9.

When the equation 5 is differentiated and the equation 5 is considered in the differentiated equation, the following equation 13 is established.

$$\Delta G = C \cdot K2 \cdot T^{K2-1} \cdot \Delta T = G \cdot K2 \cdot \Delta T/T \qquad \text{Equation 13}$$

When this equation 13 is changed, the Weber ratio $\Delta T/T$ relating to the steering torque obtained by the above-mentioned test is defined as Kt and the Weber ratio $\Delta F/F$ relating to the lateral acceleration is defined as Ka, the following equations 14 and 15 are established.

$$\Delta G/G = K2 \cdot \Delta T/T \qquad \text{Equation 14}$$

$$K2 = Ka/Kt \qquad \text{Equation 15}$$

In the equation 15, Kt is the Weber ratio relating to the steering torque and Ka is the Weber ratio relating to the lateral acceleration. Both are given as constants, so that the coefficient K2 can also be calculated based upon the equation 15 by using these Weber ratios Kt and Ka.

Supposing that the maximum value of the lateral acceleration is Gmax and the maximum value of the steering torque is Tmax, the following equation 16 is derived from the equation 5.

$$C = G\max/T\max^{K2} \qquad \text{Equation 16}$$

In this equation 16, Gmax and Tmax are constants determined by the test and system, and K2 is calculated by the equation 15, so that the constant (coefficient) C can also be calculated.

As described above, by determining the maximum value $\theta$max of the steering angle $\theta$, maximum value Tmax of the steering torque T, maximum value Gmax of the lateral acceleration G, minimum steering torque To, minimum sensible lateral acceleration Go, the Weber ratio Kt relating to the steering torque T and the Weber ratio Ka relating to the lateral acceleration by the test and system, the coefficients K1, K2 and C in the equations 1 to 6 can be determined beforehand by calculation. Accordingly, the reaction force torque Tz, steering torque Td and anticipated lateral acceleration Gd, those of which are adapted to the perception characteristic of a driver, can be calculated by using the equations 1 to 7 at the displacement/torque conversion sections 41, 51 and torque/lateral-acceleration conversion section 52.

Figure 5:
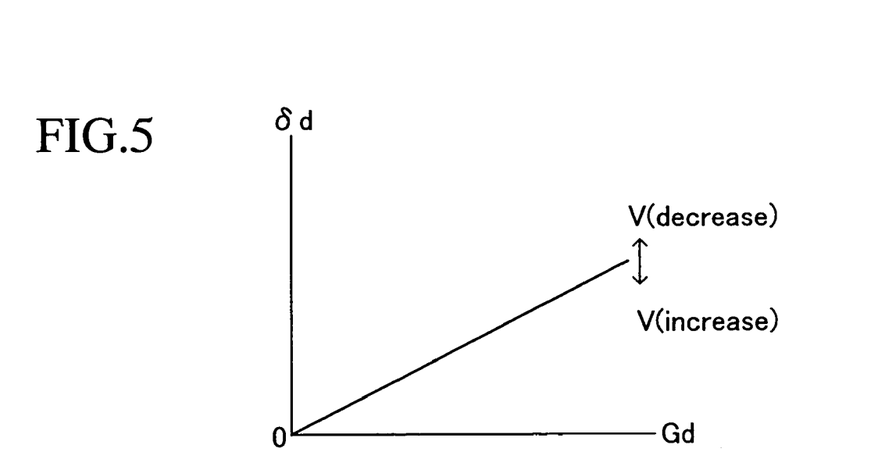
FIG. 5 is a graph showing a relationship between an anticipated lateral acceleration and a target turning angle.

Returning again to the explanation about FIG. 2, the anticipated lateral acceleration Gd calculated at the torque/lateral-acceleration conversion section 52 is supplied to the turning angle conversion section 53. The turning angle conversion section 53 calculates the target turning angle $\delta$d of the left and right front wheels FW1 and FW2 necessary for generating the anticipated lateral acceleration Gd. As shown in FIG. 5, the turning angle conversion section 53 has a table representing a changing characteristic of the target turning angle $\delta$d, which changes according to the vehicle speed V, with respect to the anticipated lateral acceleration Gd. This table is a set of data collected by running the vehicle as the vehicle speed V is changed and measuring beforehand the turning angle $\delta$ of the left and right front wheels FW1 and FW2 and the lateral acceleration G. The turning angle conversion section 53 refers to this table for calculating the target turning angle $\delta$d corresponding to the inputted anticipated lateral acceleration Gd and the detected vehicle speed V inputted from the vehicle speed sensor 33. Although the lateral acceleration G (anticipated lateral acceleration Gd) and the target turning angle $\delta$d stored in the table are both positive, the outputted target turning angle $\delta$d becomes negative if the anticipated lateral acceleration Gd supplied from the torque/lateral-acceleration conversion section 52 is negative.

This calculated target turning angle $\delta$d is supplied to a turning angle correcting section 61 of the turning control section 60. The target turning angle $\delta$d supplied to the turning angle correcting section 61 is the value that the turning angle conversion section 53 calculates based upon the conversion table stored beforehand and shown in FIG. 5. The thus calculated target turning angle δd is not calculated considering a steering characteristic in the actual vehicle turning (this steering characteristic upon the turning is hereinafter referred to as dynamic steering characteristic), e.g., a steering characteristic changed by the turning state involved with a vehicle slip generated upon the turning, but it is determined in one-to-one relationship with the detected vehicle speed V, in other words, it is based upon a static steering characteristic. Accordingly, in case where the left and right front wheels FW1 and FW2 are controlled so as to be turned with the calculated target turning angle δd, there may be a case where the vehicle turning state expected beforehand (specifically, the turning state determined by the target turning angle δd) varies from hour to hour, and the anticipated lateral acceleration Gd anticipated by a driver cannot correctly be generated.

Specifically, there may be a case where the lateral acceleration G actually generated on the vehicle and the anticipated lateral acceleration Gd by the turning state expected beforehand are different from each other because of the fact that the actual vehicle turning state is changed from a steady-state cornering state expected beforehand. According to this, a driver has a sense of incongruity, such as he/she senses a phase lag (delay) between the period when he/she expects the generation of the anticipated lateral acceleration Gd and the period when the lateral acceleration corresponding to the anticipated lateral acceleration Gd is actually generated on the vehicle, or senses a response delay (hereinafter referred to as transient response delay) by the time when the left and right wheels FW1 and FW2 are controlled so as to be turned into the target turning angle δd and start turning with the target turning angle δd. In order to eliminate this incongruity, the turning angle correcting section 61 inputs the actual yaw rate γ detected by the yaw rate sensor 34 and inputs a vehicle slip angle β, as a steering characteristic amount, from a slip angle calculating section 62, thereby correcting the supplied target turning angle δd for calculating a corrected target turning angle δda.

The slip angle calculating section 62 inputs the anticipated lateral acceleration Gd from the torque/lateral-acceleration conversion section 52 and also inputs the vehicle speed V detected by the vehicle speed sensor 33 and the actual yaw rate γ detected by the yaw rate sensor 34. By using these values, the slip angle calculating section 62 calculates the vehicle slip angle β generated when the vehicle turns with the anticipated lateral acceleration Gd. The positive value of the slip angle β represents the slip angle in the rightward direction, while the negative value of the slip angle β represents the slip angle in the leftward direction. Upon calculating this slip angle β, the relationship between the lateral acceleration G generated upon the turning of the vehicle and the actual yaw rate γ detected by the yaw rate sensor 34 can be represented by the following equation 17.

$$G=V\cdot(\beta'+\gamma) \quad \text{Equation 17}$$

Note that β' is a time-differentiated value of the vehicle slip angle β. According to this, the time-differentiated value of the slip angle β of when the vehicle turns with the anticipated lateral acceleration Gd is represented by the following equation 18 that is changed from the equation 17.

$$\beta'=Gd/V-\gamma \quad \text{Equation 18}$$

Accordingly, the slip angle calculating section 62 calculates the slip angle β of when the vehicle turns with the anticipated lateral acceleration Gd in accordance with the following equation 19, i.e., by integrating the equation 18 with a time t.

$$\beta=\int(Gd/V-\gamma)dt \quad \text{Equation 19}$$

The thus calculated slip angle β is supplied to the turning angle correcting section 61. The turning angle correcting section 61 corrects the target turning angle δd in accordance with the following equation 20, thereby calculating the corrected target turning angle δda.

$$\delta da=\delta d+(1+Kr/Kf)\cdot\beta+(If-Ir\cdot Kr/Kf)\cdot\gamma/V \quad \text{Equation 20}$$

Note that Kf and Kr in the equation 20 are cornering powers (i.e., friction force between the tire and the road surface upon the turning of the vehicle) of front wheel tire and rear wheel tire, and If and Ir are distances between front and rear axles and the center of gravity. Further, the second term in the right side in the equation 20 is a term for correcting the phase lag that the driver senses due to the vehicle slip, and the third term in the right side in the equation 20 is a term for correcting the transient response delay.

The derivation of the equation 20 will be explained here. The motion state in the lateral direction (specifically, the direction in which the lateral acceleration is generated) upon the turning of the vehicle is represented by the following equation 21.

$$m\cdot V\cdot\beta'+2\cdot(Kf+Kr)\cdot\beta+(m\cdot V+2\cdot(If\cdot Kf-Ir\cdot Kr)/V)\cdot\gamma=2\cdot kf\cdot\delta \quad \text{Equation 21}$$

Note that m in the equation 21 is a weight of a vehicle, V is a current vehicle speed, β is a current vehicle slip angle and δ is a current turning angle. If the time-differentiated value β' of the vehicle slip angle β at the left side in the equation 21 is eliminated by using the equation 18, the following equation 22 is obtained.

$$m\cdot G+2\cdot(Kf+Kr)\cdot\beta+2\cdot(If\cdot Kf-Ir\cdot Kr)\cdot\gamma/V=2\cdot Kf\cdot\delta \quad \text{Equation 22}$$

When the equation 22 is rearranged by dividing both sides by 2·Kf, the turning angle δ is represented by the following equation 23.

$$\delta=m/(2\cdot Kf)\cdot G+(1+Kr/Kf)\cdot\beta+(If-Ir\cdot Kr/Kf)/V\cdot\gamma \quad \text{Equation 23}$$

Supposing that the coefficients m and Kf are constants at a certain moment during the turning, the first term at the right side in the equation 23 is a term calculated so as to depend upon the lateral acceleration G. Therefore, supposing that the lateral acceleration G is the anticipated lateral acceleration Gd, the value calculated by the first term at the right side in the equation 23 can be a value of the target turning angle δd calculated by the turning angle conversion section 53 based upon the static steering characteristic, and supposing that the calculated turning angle δ is the corrected target turning angle δda, the aforesaid equation 20 can be derived.

The second and third terms at the right side in the equation 20 (or in the equation 23) are terms that relate to the vehicle motion state, i.e., terms that are calculated based upon the dynamic steering characteristic, and that are correction terms for correcting the target turning angle δd. More specifically explained, the second term at the right side in the equation 20 (or in the equation 23) is a term calculated as being dependent upon the slip angle β, supposing that the coefficients Kf and Kr are constants at a certain moment during the turning. In other words, it is a term by which the difference between the angle in the turning direction expected for generating the anticipated lateral acceleration Gd anticipated by a driver and the angle in the actual vehicle turning direction is calculated. Therefore, correction is made by adding this calculated angular difference to the target turning angle δd, thereby being capable of correcting the phase lag (delay) between the period when the generation of the anticipated lateral acceleration Gd is anticipated and the period when the lateral acceleration corresponding to the anticipated lateral acceleration Gd is actually generated on the vehicle.

The third term at the right side in the equation 20 (in the equation 23) is a term calculated as being dependent upon the yaw rate γ, supposing that the coefficients If, Ir, Kf and Kr and vehicle speed V are constants at a certain moment during the turning. In other words, it is a term by which a rotational angle for rotating (more specifically, a rotation around the vertical shaft at the center of gravity of the vehicle) the vehicle so as to match the current vehicle turning direction to the turning direction for generating the anticipated lateral acceleration Gd anticipated by the driver. Therefore, correction is made by adding this calculated rotational angle to the target turning angle δd, thereby being capable of reducing the transient response delay, i.e., being capable of quickly matching the vehicle turning direction to the turning direction anticipated by the driver.

The calculated corrected target turning angle δda as described above is supplied to a drive control section 63. The drive control section 63 inputs the actual turning angle δ detected by the turning angle sensor 32 and feedback-controls the rotation of the electric motor in the turning actuator 21 such that the left and right front wheels FW1 and FW2 are turned into the corrected target turning angle δda. Further, the drive control section 63 also inputs the driving current flowing from the driving circuit 38 to the electric motor and feedback-controls the driving circuit 38 such that the driving current having a magnitude corresponding to the turning torque appropriately flows through the electric motor. By the drive control of the electric motor in the turning actuator 21, the rotation of the electric motor is transmitted to the pinion gear 23 via the turning output shaft 22, thereby displacing the rack bar 24 in the shaft direction by the pinion gear 23. The displacement of the rack bar 24 in the shaft direction turns the left and right front wheels FW1 and FW2 into the corrected target turning angle δda.

As understood from the explanation of the operation, the steering angle θ as the operation input value by the driver to the steering handle 11 is converted into the steering torque Td at the displacement/torque conversion section 51 according to the first embodiment. The converted steering torque Td is supplied to the torque/lateral-acceleration conversion section 52 to be converted into the anticipated lateral acceleration Gd. The converted anticipated lateral acceleration Gd is supplied to the turning angle conversion section 53 where the target turning angles δd is calculated. The calculated target turning angle δd is supplied to the turning angle correcting section 61. The turning angle correcting section 61 obtains the slip angle β from the slip angle calculating section 62 and actual yaw rate γ from the yaw rate sensor 34, respectively, for correcting the target turning angle δd, thereby calculating the corrected target turning angle δda. Then the left and right front wheels FW1 and FW2 are turned into the corrected target turning angle δda by the drive control section 63.

In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law. Further, the anticipated lateral acceleration Gd is changed in the manner of exponentiation function with respect to the steering torque Td calculated from the steering angle θ inputted by the driver (e.g., in the manner of exponential function with respect to the steering angle θ by changing the equation 5 to the equation 6). Accordingly, the driver can turn the steering handle 11 according to the man's perception characteristic, while feeling the lateral acceleration in accordance with the Weber-Fechner's law, thereby being capable of turning the vehicle. As a result, the driver can operate the steering handle 11 as adapted to the man's perception characteristic, thereby being capable of easily driving the vehicle.

The turning angle correcting section 61 corrects the target turning angle δd such that the actual lateral acceleration G actually generating on the vehicle correctly corresponds to the anticipated lateral acceleration Gd anticipated by the driver by considering the slip angle β involved with the slip currently generated on the vehicle, whereby the anticipated lateral acceleration Gd correctly corresponding to the steering angle θ of the steering handle 11 is generated on the vehicle. Further, upon the generation of the anticipated lateral acceleration Gd, the phase lag (delay) or transient response delay with respect to the generation period anticipated by the driver can be reduced. As a result, the driver can turn the steering handle 11, while sensing the lateral acceleration (anticipated lateral acceleration Gd) more correctly adapting to the man's perception characteristic. Therefore, driving the vehicle is more facilitated.

In the first embodiment, the equation 20 was derived by eliminating β', that is the time-differentiated value of the slip angle β, in the equation 21 with the use of the equation 18. Then, the turning angle correcting section 61 corrected the target turning angle δd supplied from the turning angle conversion section 53 by using the slip angle β calculated from the equation 19 and the yaw rate γ detected by the yaw rate sensor 34, in accordance with the equation 20, thereby calculating the corrected target turning angle δda. However, the corrected target turning angle δda can be calculated by eliminating the yaw rate γ in the equation 21 in accordance with the equation 17. The motion state in the lateral direction of the vehicle can be represented as more simplified (i.e., the vehicle motion state quantity is reduced) by calculating the corrected target turning angle δda by eliminating the yaw rate γ as described above. This modified example will be more specifically explained hereinafter. This modified example is the same as the first embodiment except that the calculation equation (the equation 20) of the corrected target turning angle δda in the turning angle correcting section 61 is different, so that the detailed explanation thereof is omitted.

In this modified example, the turning angle correcting section 61 shown in FIG. 2 corrects the target turning angle δd supplied from the turning angle conversion section 53 in accordance with the following equation 24, thereby calculating the corrected target turning angle δda.

$$\delta da = \delta d + (1 + Kr/Kf) \cdot \beta - (If - Ir \cdot Kr/Kf)/V \cdot \beta' \quad \text{Equation 24}$$

Note that Kf and Kr in the equation 24 are cornering powers (i.e., friction force between the tire and the road surface upon the turning of the vehicle) of front wheel tire and rear wheel tire, and If and Ir are distances between front and rear axles and the center of gravity. Further, the second term in the right side in the equation 24 is a term for correcting the phase lag that the driver senses due to the vehicle slip, and the third term at the right side in the equation 24 is a term for correcting the transient response delay.

The derivation of the equation 24 will be explained here. Upon deriving the equation 24, the equation 17 is changed, so that the yaw rate γ of when the vehicle turns with the lateral acceleration G is represented by the following equation 25.

$$\gamma = G/V - \beta' \quad \text{Equation 25}$$

Note that β' is a time-differentiated value like the equation 17. When the equation 21 is rearranged by eliminating the yaw rate γ with the use of the equation 25, the following equation 26 is obtained.

$$(m + 2 \cdot (If \cdot Kf - Ir \cdot Kr)/V^2) \cdot G + 2 \cdot (Kf + Kr) \cdot \beta - 2 \cdot (If \cdot Kf - Ir \cdot Kr)/V \cdot \beta' = 2Kf \cdot \delta \quad \text{Equation 26}$$

When the equation 26 is rearranged by dividing both sides by 2·Kf, the turning angle δ is represented by the following equation 27.

$$\delta = (m \cdot V^2 + 2 \cdot (Ir \cdot Kf - Ir \cdot Kr))/(2 \cdot Kf \cdot V^2) \cdot G + (1 + Kr/Kf) \cdot \beta - (If \cdot Kf - Ir \cdot Kr/Kf)/V \cdot \beta' \quad \text{Equation 27}$$

Supposing that the coefficients m, V, If, Ir, Kf and Kr are constants at a certain moment during the turning, the first term at the right side in the equation 27 is a term calculated so as to depend upon the lateral acceleration G. Therefore, supposing that the lateral acceleration G is the anticipated lateral acceleration Gd, the value calculated by the first term at the right side in the equation 27 can be a value of the target turning angle δd calculated by the turning angle conversion section 53 based upon the static steering characteristic, and supposing that the calculated turning angle δ is the corrected target turning angle δda, the aforesaid equation 24 can be derived.

The second and third terms at the right side in the equation 24 are terms that relate to the vehicle motion state, i.e., terms that are calculated based upon the dynamic steering characteristic, and that are correction terms for correcting the target turning angle δd, like the equation 20 in the first embodiment. More specifically explained, the second term at the right side in the equation 24 is a term calculated as being dependent upon the slip angle β, supposing that the coefficients Kf and Kr are constants at a certain moment during the turning. In other words, it is a term by which the difference between the angle in the turning direction expected for generating the anticipated lateral acceleration Gd anticipated by a driver and the angle in the actual vehicle turning direction is calculated. Therefore, correction is made by adding this calculated angular difference to the target turning angle δd, thereby being capable of correcting the phase lag (delay) between the period when the generation of the anticipated lateral acceleration Gd is anticipated and the period when the lateral acceleration corresponding to the anticipated lateral acceleration Gd is actually generated on the vehicle.

The third term at the right side in the equation 24 is a term calculated as being dependent upon the time-differentiated value β' of the slip angle, i.e., upon the changing amount (slope) of the slip angle β at a certain moment, supposing that the coefficients If, Ir, Kf and Kr and vehicle speed V are constants at a certain moment during the turning. The slip angle β is a variable that is decreased with a lapse of time, and becomes "0" after all. Therefore, the time-differentiated value of the slip angle β, i.e., the slope of the change becomes negative. Accordingly, the transient response delay can be reduced by the correction in which this calculated third term is added up to (or subtracted from) the target turning angle δd.

The calculated corrected target turning angle δda as described above is supplied to the drive control section 63. The drive control section 63 feedback-controls the rotation of the electric motor in the turning actuator 21 such that the left and right front wheels FW1 and FW2 are turned into the corrected target turning angle δda. According to this, the vehicle turns for generating the anticipated lateral acceleration Gd anticipated by the driver.

As understood from the above explanation, according to this modified example too, the turning angle correcting section 61 corrects the target turning angle δd such that the actual lateral acceleration G actually generated on the vehicle correctly corresponds to the anticipated lateral acceleration Gd anticipated by the driver by considering the slip angle β involved with the slip currently generated on the vehicle, whereby the anticipated lateral acceleration Gd correctly corresponding to the steering angle θ of the steering handle 11 is generated on the vehicle. Further, upon the generation of the anticipated lateral acceleration Gd, the phase lag (delay) or transient response delay with respect to the generation period anticipated by the driver can be eliminated. As a result, the driver can turn the steering handle 11, while sensing the lateral acceleration (anticipated lateral acceleration Gd) more correctly adapting to the man's perception characteristic. Therefore, driving the vehicle is more facilitated. Further, in this case, the target turning angle δd can be corrected to the corrected target turning angle δda without using the yaw rate sensor 34, so that the vehicle is structurally simplified. Moreover, the same effects can be expected as the first embodiment, as for the other effects.

Second Embodiment

Subsequently, a second embodiment of the present invention will be explained wherein a yaw rate is used instead of the lateral acceleration as a motion state quantity in the first embodiment. This second embodiment is also provided with a lateral acceleration sensor 35 detecting an actual lateral acceleration G which is a motion state quantity that the driver can perceive, in addition to the yaw rate sensor 34 in the first embodiment. The other configurations are same as those in the first embodiment, but the computer program executed by the electronic control unit 36 is different from the first embodiment.

Figure 6:
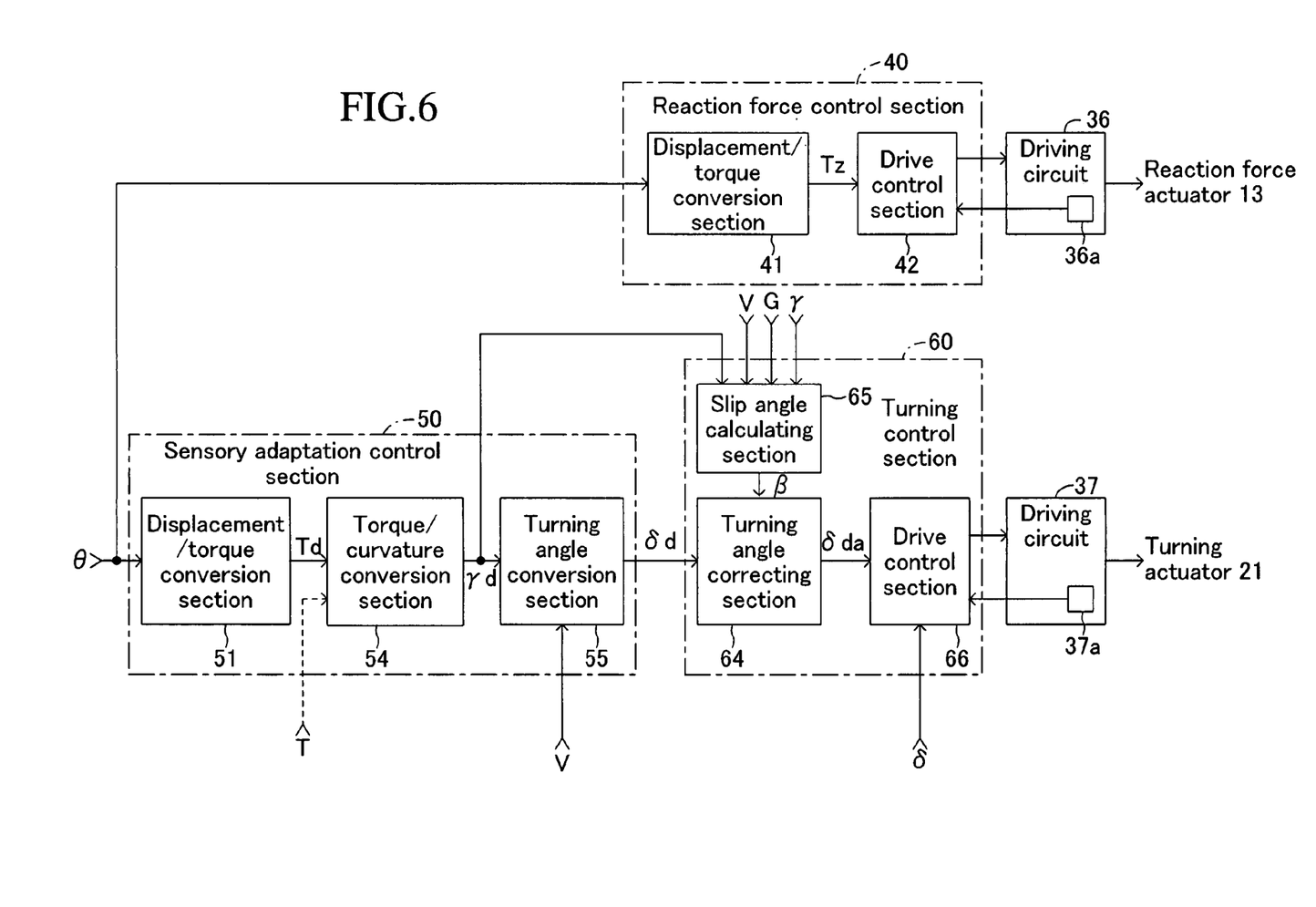
FIG. 6 is a functional block diagram functionally showing a computer program processing executed by an electronic control unit of FIG. 1 according to the second embodiment.

The computer program executed in the electronic control unit 36 in the second embodiment is shown in FIG. 6 by a functional block diagram. In this case, the displacement/torque conversion section 51 functions in the same manner as the first embodiment, but a torque/yaw-rate conversion section 54 is provided instead of the torque/lateral-acceleration conversion section 52 in the sensory adaptation control section 50.

The torque/yaw-rate conversion section 54 calculates, according to the following equation 28, the anticipated yaw rate γ, that is anticipated by the driver from the turning operation of the steering handle 11, by using the steering torque Td calculated at the displacement/torque conversion section 51.

$$\gamma d = C \cdot Td^{K2} (T0 \leq |Td|) \quad \text{Equation 28}$$

Figure 7:
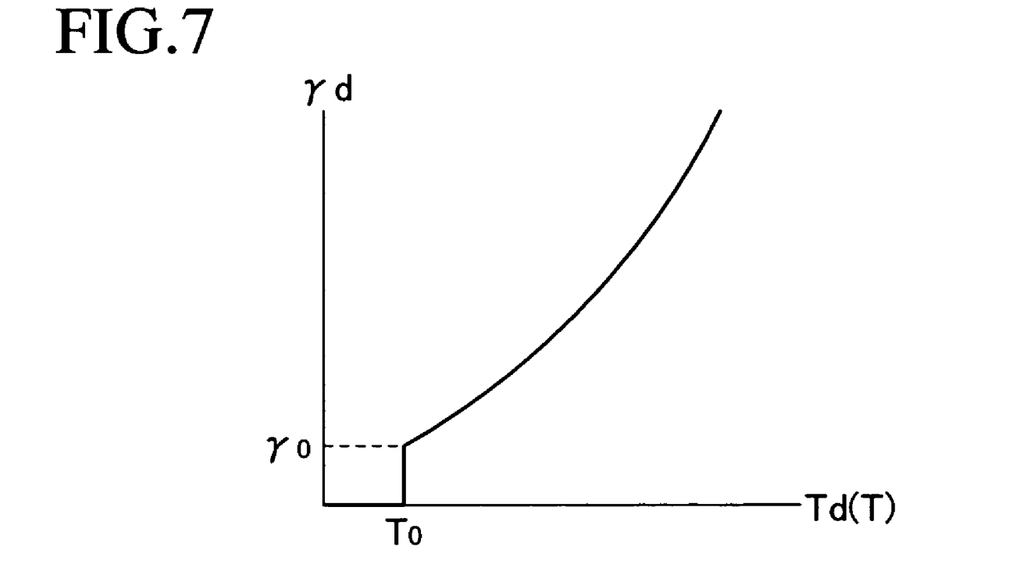
FIG. 7 is a graph showing a relationship between a steering torque and an anticipated yaw rate.

C and K2 in the equation 28 are constants like the first embodiment. The steering torque Td in the equation 28 represents an absolute value of the steering torque Td calculated by using the equations 3 and 4. Therefore, if the calculated steering torque Td is positive, the constant C is made positive, while if the calculated steering torque Td is negative, the constant C is made negative having the absolute value same as the positive constant C. Further, in case where the steering torque Td is less than the predetermined value To, the anticipated yaw rate γd is kept to be "0". According to this, in case where the steering handle 11 is held to be at the neutral position (where the steering angle θ is almost "0"), the anticipated yaw rate γd is kept to be "0", thereby being capable of being adapted to a driver's perception characteristic. The anticipated yaw rate γd may also be calculated by using a conversion table having a characteristic shown in FIG. 7 and having stored therein the anticipated yaw rate γd with respect to the steering torque Td, instead of the calculation of the equation 28.

Figure 8:
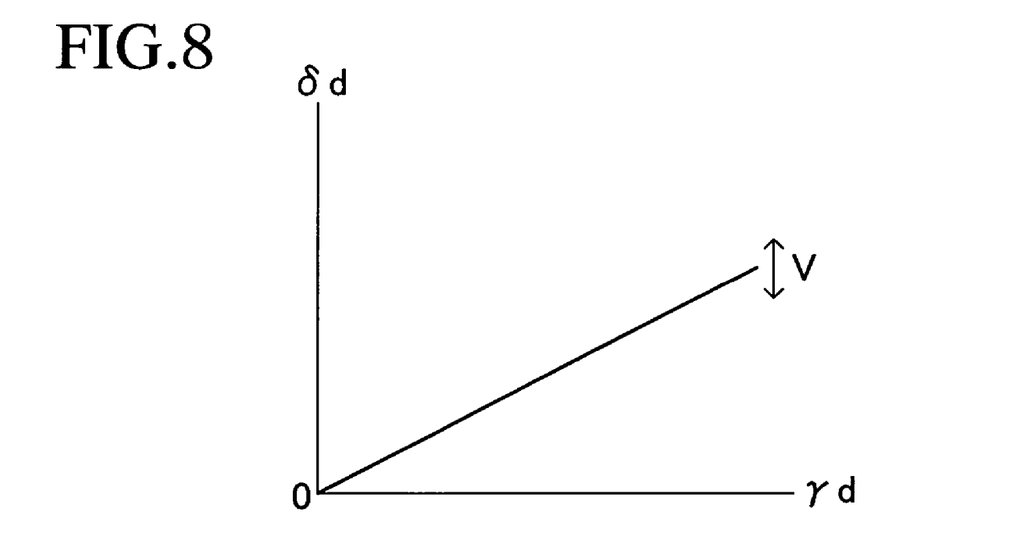
FIG. 8 is a graph showing a relationship between an anticipated yaw rate and a target turning angle.

A turning angle conversion section 55 calculates the target turning angle δd of the left and right front wheels FW1 and FW2 necessary for generating the calculated anticipated yaw rate γd. As shown in FIG. 8, the turning angle conversion section 55 has a table representing a changing characteristic of the target turning angle δd, which changes according to the vehicle speed V, with respect to the anticipated yaw rate γd. This table is a set of data collected by running the vehicle as the vehicle speed V is changed and measuring beforehand the turning angle δ of the left and right front wheels FW1 and FW2 and the yaw rate γ. The turning angle conversion section 55 refers to this table for calculating the target turning angle δd corresponding to the inputted anticipated yaw rate γd and the detected vehicle speed V inputted from the vehicle speed sensor 33. Although the yaw rate γ (anticipated yaw rate γd) and the target turning angle δd stored in the table are both positive, the outputted target turning angle δd becomes negative if the anticipated yaw rate γd supplied from the torque/yaw-rate conversion section 54 is negative.

This calculated target turning angle δd is supplied to the turning angle correcting section 64 of the turning control section 60. The target turning angle δd supplied to the turning angle correcting section 64 is, in this second embodiment, also the value that the turning angle conversion section 55 calculates based upon the conversion table stored beforehand and shown in FIG. 7. The thus calculated target turning angle δd is not calculated considering a dynamic steering characteristic, but it is determined in one-to-one relationship with the detected vehicle speed V, like the first embodiment. Accordingly, in case where the left and right front wheels FW1 and FW2 are controlled so as to be turned with the calculated target turning angle δd, there may be a case where the vehicle running direction varies from hour to hour due to the slip, so that the yaw rate actually generated on the vehicle and the anticipated yaw rate γd are different from each other, whereby the anticipated yaw rate γd anticipated by a driver cannot correctly be generated. In view of this, the turning angle correcting section 64 inputs the vehicle slip angle β from the slip angle calculating section 65, and corrects the supplied target turning angle δd for calculating the corrected target turning angle δda.

The slip angle calculating section 65 inputs the vehicle speed V detected by the vehicle speed sensor 33, actual yaw rate γ detected by the yaw rate sensor 34 and actual lateral acceleration G detected by the lateral acceleration sensor 35, thereby calculating the vehicle slip angle β currently generated on the vehicle. The positive value of the slip angle β represents the slip angle in the rightward direction, while the negative value of the slip angle β represents the slip angle in the leftward direction. Upon calculating this slip angle β in the second embodiment, the relationship between the lateral acceleration G and the yaw rate γ generated upon the turning of the vehicle can be also represented by the aforesaid equation 17. The time-differentiated value of the vehicle slip angle β at this time is represented by the following equation 29.

$$\beta' = G/V - \gamma \qquad \text{Equation 29}$$

Accordingly, the slip angle calculating section 65 calculates the slip angle β of when the vehicle turns with the actual yaw rate γ in accordance with the following equation 30 that is obtained by integrating the equation 29 with a time t.

$$\beta = \int (G/V - \gamma) dt \qquad \text{Equation 30}$$

The thus calculated slip angle β is supplied to the turning angle correcting section 64. The turning angle correcting section 64 corrects the target turning angle δd in accordance with the following equation 31, thereby calculating the corrected target turning angle δda.

$$\delta da = \delta d + (1 - Ir \cdot Kr/If \cdot Kf) \cdot \beta \qquad \text{Equation 31}$$

Note that Kf and Kr in the equation 31 are cornering powers (i.e., friction force between the tire and the road surface upon the turning of the vehicle) of front wheel tire and rear wheel tire, and If and Ir are distances between front and rear axles and the center of gravity. The derivation of this equation 31 will be more specifically explained hereinafter.

The motion around the inertia shaft of the vehicle is represented by the following equation 32.

$$I \cdot (d\gamma/dt) + 2 \cdot (If^2 \cdot Kf + Ir^2 \cdot Kr)/V \cdot \gamma + 2 \cdot (If \cdot Kf - Ir \cdot Kr) \cdot \beta = 2 \cdot If \cdot Kf \cdot \delta \qquad \text{Equation 32}$$

Note that, in the equation 32, I is an inertia efficiency of the inertia generated on the vehicle, i.e., the magnitude of the turn upon the turning of the vehicle, γ is a current yaw rate, V is a current vehicle speed, β is a current vehicle slip angle and δ is a current turning angle. In case where the vehicle has a steering characteristic wherein the vehicle turns as the turning angle determined by the operation of the steering handle 11 by the driver (so-called neutral steer characteristic), the vehicle turns without slipping, i.e., without having the slip angle β. Therefore, the third term in the left side in the equation 32 becomes "0", whereby the vehicle motion around the inertia shaft is only dependent upon the yaw rate γ, thus represented by the following equation 33.

$$I \cdot (d\gamma/dt) + 2 \cdot (If^2 \cdot Kf + Ir^2 \cdot Kr)/V \cdot \gamma = 2 \cdot If \cdot Kf \cdot \delta \qquad \text{Equation 33}$$

Specifically, in order to turn the vehicle around the inertia shaft in accordance with the equation 33, i.e., in order to turn the vehicle with the neutral steer characteristic, the turning angle δ in the right side of the equation 32 may be substituted with the turning angle represented by the following equation 34.

$$\delta + (1 - Ir \cdot Kr/If \cdot Kf) \cdot \beta \qquad \text{Equation 34}$$

In the equation 34, supposing that Kf, Kr, If and Ir at a certain moment during the turn of the vehicle are constants, (1−Ir·Kr/If·Kf) becomes a constant. Therefore, the value obtained by multiplying the slip angle β currently generated on the vehicle by the constant value is added to the current turning angle δ, i.e., the angle obtained by correcting the current turning angle δ with the slip angle β is determined as the new turning angle δ, whereby the vehicle seems to have the neutral steer characteristic. Accordingly, supposing that the current turning angle δ is the target turning angle δd supplied from the turning angle conversion section 53 and the new turning angle δ is the corrected target turning angle δda, the aforesaid equation 31 is derived.

Further, the corrected target turning angle δda is calculated in accordance with the equation 31 and the vehicle turns with the corrected target turning angle δda, whereby the driver can turn the vehicle, perceiving as if the slip generated on the vehicle is reduced (or the cornering power at the side of the front wheels is increased). More specifically explained, the motion state in the lateral direction upon the turning of the vehicle is represented by the following equation 35 like the equation 21, as explained in the first embodiment.

$$m \cdot V \cdot \beta' + 2 \cdot (Kf + Kr) \cdot \beta + (m \cdot V + 2 \cdot (If \cdot Kf - Ir \cdot Kr)/V) \cdot \gamma = 2 \cdot Kf \delta \quad \text{Equation 35}$$

If the equation 35 is rearranged by substituting the new turning angle δ calculated in accordance with the equation 34 into the turning angle δ in the equation 35, the following equation 36 is obtained.

$$m \cdot V \cdot \beta' + 2 \cdot (Kf + Kr) \cdot \beta + (m \cdot V + 2 \cdot (If \cdot Kf - Ir \cdot Kr)/V) \cdot \gamma = 2 \cdot Kf \cdot (\delta + (1 - Ir \cdot Kr/If \cdot Kf) \cdot \beta) \quad \text{Equation 36}$$

If this equation 36 is further rearranged, the following equation 37 is established.

$$m \cdot V \cdot \beta' + 2 \cdot ((Ir/If) \cdot Kr + Kr) \cdot \beta + (m \cdot V + 2 \cdot (If \cdot Kf - Ir \cdot Kr)/V) \cdot \gamma = 2 \cdot Kf \delta \quad \text{Equation 37}$$

Comparing the equation 35 and the equation 37, the cornering power Kf at the side of front wheels at the second term in the left side of the equation 35 is represented by (Ir/If)·Kr shown at the second term in the left side of the equation 37. This means that the cornering power at the side of front wheels is apparently increased by calculating the corrected target turning angle δda in accordance with the equation 31 for controlling the left and right front wheels FW1 and FW2 so as to turn with the corrected target turning angle δda. Specifically, a vehicle generally has a steering characteristic (so-called understeer characteristic) wherein the cornering power Kf at the side of front wheels is decreased compared to the cornering power Kr at the side of rear wheels, whereby a slip is generated at the side of front wheels upon the turning, and hence, the turning radius becomes greater than the turning radius demanded by the driver. If the cornering power Kf at the side of front wheels at the second term in the left side of the equation 35 is represented by (Ir/If)·Kf shown at the second term in the left side of the equation 37 in the vehicle having the understeer characteristic, the cornering power at the side of front wheels is apparently increased, with the result that the influence given by the slip generated on the vehicle can be reduced.

The calculated corrected target turning angle δda as described above is supplied to the drive control section 66. The drive control section 66 feedback-controls the rotation of the electric motor in the turning actuator 21 such that the left and right front wheels FW1 and FW2 are turned into the corrected target turning angle δda. According to this, the vehicle turns for generating the anticipated yaw rate γd anticipated by the driver.

As understood from the above explanation of the operation, the steering angle θ as the operation input value by the driver to the steering handle 11 is converted into the steering torque Td at the displacement/torque conversion section 51 according to the second embodiment. The converted steering torque Td is supplied to the torque/yaw-rate conversion section 54 to be converted into the anticipated yaw rate γd. The converted anticipated yaw rate γd is supplied to the turning angle conversion section 55 where the target turning angle δd is calculated. The calculated target turning angle δd is supplied to the turning angle correcting section 64. The turning angle correcting section 64 obtains the slip angle β from the slip angle calculating section 65 for correcting the target turning angle δd, thereby calculating the corrected target turning angle δda. Then, the left and right front wheels FW1 and FW2 are turned into the corrected target turning angle δda by the drive control section 66.

In this case, the steering torque Td is a physical quantity that can be perceived by the driver from the steering handle 11 due to the action of the reaction force actuator 13. The steering torque Td is also changed in the manner of exponential function with respect to the steering angle θ. Therefore, the driver can turn the steering handle 11 according to the man's perception characteristic, while feeling the reaction force according to the Weber-Fechner's law. Further, the anticipated yaw rate γd is changed in the manner of exponentiation function with respect to the steering torque Td calculated from the steering angle θ inputted by the driver (e.g., in the manner of exponential function with respect to the steering angle θ by changing the equation 28 by the same manner as the change of the equation 5 to the equation 6). Accordingly, the driver can turn the steering handle 11 according to the man's perception characteristic, while feeling the lateral acceleration in accordance with the Weber-Fechner's law, thereby being capable of turning the vehicle. As a result, the driver can operate the steering handle 11 as adapted to the man's perception characteristic, thereby being capable of easily driving the vehicle.

Further, the turning angle correcting section 64 corrects the target turning angle δd such that the actual yaw rate γ actually generated on the vehicle correctly corresponds to the anticipated yaw rate γd anticipated by the driver by considering the slip angle β involved with the slip currently generated on the vehicle, whereby the anticipated yaw rate γd correctly corresponding to the steering angle θ of the steering handle 11 is generated on the vehicle. Further, the target turning angle δd is corrected to the corrected target turning angle δda, whereby the driver perceives as if the slip generated on the vehicle (specifically, the slip angle β) is reduced. As a result, the driver can turn the steering handle 11, while sensing the yaw rate (anticipated yaw rate γd) more correctly adapting to the man's perception characteristic. Therefore, driving the vehicle is more facilitated.

The second embodiment corrected the target turning angle δd so as to reduce the influence given by the slip generated on the vehicle, thereby calculating the corrected target turning angle δda, and caused the anticipated yaw rate γd anticipated by a driver to correctly generate. On the other hand, it is possible to eliminate the phase lag (delay) between the period when the anticipated yaw rate γd is anticipated and the period when the yaw rate corresponding to the anticipated yaw rate γd is actually generated, for more correctly generating the anticipated yaw rate γd anticipated by the driver. This modified example will be more specifically explained hereinafter. This modified example is the same as the second embodiment except that the calculation equation (the equation 31) of the corrected target turning angle δda in the turning angle correcting section 64 is different, so that the detailed explanation thereof is omitted.

In this modified example, the turning angle correcting section 64 shown in FIG. 6 corrects the target turning angle δd supplied from the turning angle conversion section 55 in accordance with the following equation 38, thereby calculating the corrected target turning angle δda.

$$\delta da = \delta d + (1 - Ir \cdot Kr/If \cdot Kf) \cdot \beta + I \cdot V/(2 \cdot (If^2 \cdot Kf + Ir^2 \cdot Kr)) \cdot \delta d' \quad \text{Equation 38}$$

Note that Kf and Kr in the equation 38 are cornering powers (i.e., friction force between the tire and the road surface upon the turning of the vehicle) of front wheel tire and rear wheel tire, If and Ir are distances between front and rear axles and the center of gravity, and I is an inertia efficiency of the inertia generated on the vehicle, i.e., the magnitude of the turn when the vehicle turns. Further, the second term in the right side in the equation 38 is a term for correcting the phase lag (delay) between the period of generation of the anticipated yaw rate γd and the period of generation of the actual yaw rate.

The equation 38 will be explained in detail here. As explained in the second embodiment, the motion around the inertia shaft is represented in accordance with the equation 32. In this case, in order to turn the vehicle as if it has a neutral steer characteristic, the corrected target turning angle δda calculated in accordance with the equation 31 is substituted with the turning angle δ in the equation 32, whereby the vehicle motion around the inertia shaft is represented by the equation 33. This makes it possible to correctly generate the anticipated yaw rate γd anticipated by the driver. On the other hand, the left and right front wheels FW1 and FW2 are controlled so as to turn with the corrected target turning angle δda calculated in accordance with the equation 31, whereby the anticipated yaw rate γd anticipated by the driver can correctly be generated, but there arises a phase lag (delay) from when the left and right front wheels FW1 and FW2 are turned into the corrected target turning angle δda to when the anticipated yaw rate γd is generated.

Therefore, a time-change characteristic of the target turning angle δd (turning angle δ) supplied from the turning angle conversion section 55, i.e., a time-differentiated term of the target turning angle δd (turning angle δ) is added to the corrected target turning angle δda calculated in accordance with the equation 31, whereby the generated phase lag can be solved. For explaining this scheme in detail, the turning angle represented by the following equation 39 is substituted into the turning angle δ at the right side of the equation 32.

$$\delta + (1 - Ir \cdot Kr/If \cdot Kf) \cdot \beta + I \cdot V/(2 \cdot (If^2 \cdot Kf + Ir^2 \cdot Kr)) \cdot \delta' \qquad \text{Equation 39}$$

When the equation 32 having the substituted turning angle is rearranged, the following equation 40 is obtained.

$$I \cdot (d\gamma/dt) + 2 \cdot (If^2 \cdot Kf + Ir^2 \cdot Kr)/V \cdot \gamma = 2 \cdot If \cdot Kf \cdot (\delta + I \cdot V/(2 \cdot (If^2 \cdot Kf + Ir^2 \cdot Kr))) \cdot \delta \qquad \text{Equation 40}$$

When the differential equation of the equation 40 is solved for time t, the following equation 41 is obtained.

$$\gamma(t) = If \cdot Kf \cdot V/(If^2 \cdot Kf + Ir^2 \cdot Kr) \cdot \delta(t) + (\gamma o - If \cdot Kf \cdot V/(If^2 \cdot Kf + Ir^2 \cdot Kr) \cdot \delta o) \cdot \exp((2 \cdot (If^2 \cdot Kf + Ir^2 \cdot Kr)/I \cdot V) \cdot t) \qquad \text{Equation 41}$$

Note that γo and δo in the equation 41 are predetermined constants. As apparent from the equation 41, the phase between the time function γ(t) of the yaw rate γ and the time function δ(t) of the turning angle δ are perfectly synchronized. Accordingly, the equation 38 can be derived, if the current turning angle δ is made to be the target turning angle δd supplied from the turning angle conversion section 55 and the new turning angle δ is made to be the corrected target turning angle δda in the equation 39. As can be understood from the above explanation, this modified example eliminates the phase lag (delay), thereby being capable of correctly generating the anticipated yaw rate γd anticipated by a driver. Moreover, the same effects can be expected as the second embodiment, as for the other effects.

In the first embodiment, second embodiment and each of the modified examples, the steering angle θ is used as an operation input value of the steering handle 11. On the other hand, hereinafter explained is a modified example wherein a steering torque T is utilized as the operation input value of the steering handle 11. This modified example is provided with a steering torque sensor 39 that is mounted to the steering input shaft 12 for detecting the steering torque T given to the steering handle 11 as shown by a broken line in FIG. 1. The other configurations are same as those in the first, second embodiment and each of the modified examples, but the computer program executed by the electronic control unit 36 is slightly different from the first embodiment, second embodiment and each of the modified examples.

In this modified example, the displacement/torque conversion section 51 is not provided in the functional block diagrams of FIGS. 2 and 6 showing the computer program, wherein the torque/lateral-acceleration conversion section 52 or torque/yaw-rate conversion section 54 calculates the anticipated lateral acceleration Gd by the computation of the equation 5 or the anticipated yaw rate γd by the computation of the equation 28 using the steering torque T detected by the steering torque sensor 39, instead of the steering torque Td calculated at the displacement/torque conversion section 51 in the first embodiment, second embodiment and each of the modified examples. In this case too, the anticipated lateral acceleration Gd may be calculated by using the table representing the characteristic shown in FIG. 4 instead of the computation of the equation 5, or the anticipated yaw rate γd may be calculated by using the table representing the characteristic shown in FIG. 7 instead of the computation of the equation 28. The other program processes executed at the electronic control unit 36 are the same as those of the first embodiment, second embodiment and each of the modified examples.

According to this modified example, the steering torque T serving as the operation input value of the driver to the steering handle 11 is converted into the anticipated lateral acceleration Gd or anticipated yaw rate γd by the torque/lateral-acceleration conversion section 52 or the torque/yaw-rate conversion section 54. The converted anticipated lateral acceleration Gd or anticipated yaw rate γd is decided as the target turning angle δd by the turning angle conversion section 53 or 55, whereupon the target turning angle δd is corrected to the corrected target turning angle δda by the turning angle correcting section 61 or 64. Then, the left and right front wheels FW1 and FW2 are turned into the corrected target turning angle δda by the drive control section 63 or 66. In this case too, the steering torque T is a physical quantity that the driver can perceive from the steering handle 11 and the anticipated lateral acceleration Gd or anticipated yaw rate γd is also changed in the manner of exponentiation function (e.g., in the manner of exponential function with respect to the steering angle θ by changing the equation 5 to the equation 6) with respect to the steering torque T. Accordingly, the driver can turn the steering handle 11 according to the man's perception characteristic, while feeling the reaction force in accordance with the Weber-Fechner's law. Accordingly, in this modification example too, the driver can turn the steering handle 11 according to the man's perception characteristic, while feeling the lateral acceleration in accordance with the Weber-Fechner's law, thereby being capable of turning the vehicle, like the first embodiment, second embodiment and each of the modified example. Therefore, the same effect as the first embodiment, second embodiment and each of the modified examples is expected, and further, the other effects are similarly expected.

Further, the steering control by the first embodiment, second embodiment and each of the modified examples and the steering control by the aforesaid modified example may be changed over. Specifically, the steering angle sensor 31 and the steering torque sensor 39 are both provided, wherein the change-over can be carried out between the case where the anticipated lateral acceleration Gd or anticipated yaw rate γd is calculated by using the target steering torque Td calculated at the displacement/torque conversion section 51 like the first embodiment, second embodiment and each of the modified examples and the case where the anticipated lateral acceleration Gd or anticipated yaw rate γd is calculated by using the steering torque T detected by the steering torque sensor 39. In this case, the change-over may automatically be changed according to the intention of the driver or according to the vehicle motion state.

OTHER MODIFIED EXAMPLE

The present invention is not limited to the first and second embodiments and the modified examples, and various modifications are possible without departing from the spirit of the present invention.

For example, in the first embodiment and its modified example, the turning angle correcting sections 61 and 64 correct the target turning angle δd by correcting both the phase lag (delay) and transient response delay, thereby calculating the corrected target turning angle δda. However, it is possible to calculate the corrected target turning angle δda by correcting either one of the phase lag (delay) and the transient response delay. In this case too, the anticipated lateral acceleration Gd anticipated by a driver can correctly be generated, thereby facilitating driving a vehicle.

Further, the steering handle 11 that is turned for steering the vehicle is used in the first and second embodiments and the modified examples. However, instead of this, a steering handle of a joy stick type that linearly displaces may be used, or any other steering handles can be used so long as they are operated by the driver and can instruct the steering to the vehicle.

In the first and second embodiments and the modified examples, the turning output shaft 22 is rotated by using the turning actuator 21, thereby turning the left and right front wheels FW1 and FW2. However, instead of this, the left and right front wheels FW1 and FW2 may be turned by linearly displacing the rack bar 24 by using the turning actuator 13.

Moreover, in the first and second embodiments and the modified examples, a lateral acceleration or yaw rate is independently used as a vehicle motion state quantity that a man can perceive. However, the vehicle motion state quantity is changed over by a selecting operation by a driver or is automatically changed over according to the vehicle running state, to thereby perform a vehicle steering control. In the case of automatically changing over according to the vehicle running state, a lateral acceleration may be used as the motion state quantity when a vehicle runs with a low speed or high speed, while a yaw rate may be used as a motion state quantity when a vehicle runs with a medium speed. This achieves an appropriate vehicle steering control according to a vehicle speed, thereby more facilitating driving a vehicle.

What is claimed is:

1. A vehicle steering apparatus of a steer-by-wire system provided with a steering handle operated by a driver for steering a vehicle, a turning actuator for turning steered wheels and a turning control device that drive-controls the turning actuator according to the operation on the steering handle for turning the steered wheels, wherein the turning control device comprises:

operation input value detecting means that detects an operation input value by a driver to the steering handle;

motion state quantity calculating means that calculates an anticipated motion state quantity of the vehicle by using the detected operation input value, wherein the anticipated motion state quantity of the vehicle represents the vehicle motion state, that relates to a turn of the vehicle and can be sensed by a driver, and is in the predetermined relation of exponential function or in the predetermined relation of exponentiation function with the operation input value to the steering handle;

turning angle calculating means that calculates a turning angle of the steered wheels necessary for the vehicle to turn with the anticipated motion state quantity calculated by the motion state quantity calculating means by using the calculated motion state quantity;

motion state quantity detecting means that detects an actual motion state quantity representing an actual motion state of the vehicle;

steering characteristic quantity calculating means that calculates a steering characteristic quantity relating to the vehicle actual turning state based upon the detected actual motion state quantity;

turning angle correcting means that corrects the calculated turning angle by using the calculated steering characteristic quantity in order to generate the calculated anticipated motion state quantity; and turning control means that controls the turning actuator according to the corrected turning angle for turning the steered wheels into the corrected turning angle.

2. A vehicle steering apparatus of a steer-by-wire system according to claim 1, wherein the anticipated motion state quantity is at least either one of a lateral acceleration or a yaw rate generated on the vehicle.

3. A vehicle steering apparatus of a steer-by-wire system according to claim 1, wherein the turning angle correcting means corrects the calculated turning angle by using the calculated steering characteristic quantity in order to decrease the phase difference between the period when the anticipated motion state quantity is generated and the period when the actual motion state quantity corresponding to the anticipated motion state quantity is generated.

4. A vehicle steering apparatus of a steer-by-wire system according to claim 3, wherein the turning angle correcting means corrects the calculated turning angle by using the calculated steering characteristic quantity in order to decrease the response delay from when the turning control means starts to control the turning actuator to when the steered wheels are turned into the corrected turning angle.

5. A vehicle steering apparatus of a steer-by-wire system according to claim 1, wherein the steering characteristic quantity calculated by the steering characteristic quantity calculating means is a slip angle representing a slip generated on the vehicle due to a turn of the vehicle.

6. A vehicle steering apparatus of a steer-by-wire system according to claim 1, wherein the operation input value detecting means is composed of a displacement amount sensor that detects a displacement amount of the steering handle, and the motion state quantity calculating means is composed of operation force conversion means that converts the detected displacement amount into the operation force exerted on the steering handle and motion state quantity conversion means that converts the converted operation force into the anticipated motion state quantity.

7. A vehicle steering apparatus of a steer-by-wire system according to claim 1, wherein
the operation input value detecting means is composed of an operation force sensor that detects the operation force exerted on the steering handle, and
the motion state quantity calculating means is composed of motion state quantity conversion means that converts the detected operation force into the anticipated motion state quantity.

8. A vehicle steering apparatus of a steer-by-wire system according to claim 1, further provided with a reaction force apparatus for exerting reaction force on the operation of the steering handle.

* * * * *